United States Patent [19]
Ishigami et al.

[11] Patent Number: 5,361,360
[45] Date of Patent: Nov. 1, 1994

[54] METHOD FOR GENERATING SOFTWARE DEVELOPMENT ENVIRONMENT

[75] Inventors: Takayuki Ishigami, Yokohama; Hisanori Sugihara, Musashimurayama, both of Japan

[73] Assignees: Hitachi, Ltd.; Hitachi Information Systems, Ltd., Tokyo, Japan

[21] Appl. No.: 986,511

[22] Filed: Dec. 7, 1992

[30] Foreign Application Priority Data

Dec. 13, 1991 [JP] Japan ............................. 3-330235

[51] Int. Cl.$^5$ ............... G06F 15/00; G06F 13/00; G06F 13/14
[52] U.S. Cl. ............... 395/700; 364/DIG. 11; 364/964.34
[58] Field of Search ............................. 395/650, 700

[56] References Cited

U.S. PATENT DOCUMENTS

| | | | |
|---|---|---|---|
| 4,138,718 | 2/1979 | Toke et al. | 364/200 |
| 5,005,122 | 4/1991 | Griffin et al. | 364/200 |
| 5,008,814 | 4/1991 | Mathur | 364/200 |
| 5,162,986 | 11/1992 | Graber et al. | 364/146 |

FOREIGN PATENT DOCUMENTS 3-19023  6/1989  Japan .

OTHER PUBLICATIONS

Que's Computer User's Dictionary, 1992, p. 91.
Operating Systems by H. M. Deitel, 1990, p. 552.

Primary Examiner—Gareth D. Shaw
Assistant Examiner—Michael Richey
Attorney, Agent, or Firm—Fay, Sharpe, Beall, Fagan, Minnich & McKee

[57] ABSTRACT

In a method for generating a software development environment in a software development supporting system including a plurality of stations which are connected through a network, a first station within the plurality of stations decides one or more softwares which are a part of a development environment based on a development work procedure to be utilized. A request including the names of the requested softwares is transmitted from the first station to a second station within the plurality of stations through the network. The second station transmits, in response to the request, transmission information including the requested softwares and data corresponding thereto, to the first station through the network. The first station automatically installs the requested softwares included in the transmission information.

7 Claims, 8 Drawing Sheets

| ITEM NO. | MENU ITEM | PROCEDURE OR DOCUMENT | NO. | SPECIFICATION | TOOL | DATA | RELATIONAL TOOL | INSTALLATION CONDITION |
|---|---|---|---|---|---|---|---|---|
| 1 | REFERENCE TO SYSTEM DESIGN PROCEDURE | PRODUCTION OF APPLICATION SPEC. | 1 | DATA FLOW DIAGRAM | SEWB3/FLOW | DICTIONARY | EAGLE/4GL | |
| | | | | | SEWB3/SDF | GROUP OF PATTERNS | | |
| 2 | DO. | RELIABILITY DESIGN | 2-1 | COURSE OF RELIABILITY DESIGN | OFIS/REPORT | DESCRIPTION EXAMPLE | | INITIATABLE IN PARALLEL WITH OUTPUT DESIGN |
| 3 | DO. | INPUT DESIGN | 3-2 | INPUT SPACE | OFIS/REPORT | STANDARD FORMAT | | INITIATABLE IN PARALLEL WITH INPUT DESIGN |
| 4 | DO. | OUTPUT DESIGN | 3-1 | SCREEN/SLIP SPACE. | SEWB3/FORM | STYLE GUIDE | | TO NECESSITATE COMPLECT SPEC. OF PREVIOUS STEP |
| 5 | DO. | FILE DESIGN | 4 | FILE/RECORD SPACE. | OFIS/REPORT | FORMATT OF FILE LIST | OFIS/POL | DO. |
| | | | | | SEWB3/DATA | | SEWB/PJMS | DO. |
| 6 | DO. | MECHANICAL PROCESSING DESIGN | 5 | SKETCH OF PROGRAM PROCESSING | SEWB3/FLOW | GROUP OF PATTERNS | SEWB/PJMS | DO. |
| | | | | | SUPER PAINT | | | |
| 7 | DO. | CODE DESIGN | 2-2 | DRAWING OF CODE SPACE. | EXCEL | FORMAT OF CODE LIST | OFIS/REPORT | |
| ...... | ...... | ...... | ...... | ...... | ...... | ...... | ...... | ...... |

FIG. 4

| EVENT | CHECK TIMING |
|---|---|
| CHANGE OF HARDWARE | ① UPON USER'S DESIGNATION  ② IMMEDIATELY |
| CHANGE OF TOOL | ① UPON USER'S DESIGNATION  ② IMMEDIATELY |
| CHANGE OF DATA | ① UPON USER'S DESIGNATION  ② IMMEDIATELY |

METHOD FOR GENERATING SOFTWARE DEVELOPMENT ENVIRONMENT

BACKGROUND OF THE INVENTION

1. Field of the Invention

The present invention relates to a method for generating and maintaining a software development environment in the distributed information processing system.

2. Description of the Related Art

Conventionally, generation of an environment for developing or programming software required a display of a list of software for supporting development (hereinafter to be referred to as tools) to enable a programmer or a user to select the necessary software from this list. Similarly, a list of data to be used is also displayed so that the programmer can select the necessary data from this list.

On the other hand, the recent software development environment not only includes information about hardware, programming tools and data to be used by the tools, but also a variety of information such as information which defines development procedures, information which defines work menu definitions for a programmer to start tools based on contents of work, information which defines a system of a document to be produced, information for managing a structure of a result of software programming and the progress of programming, etc. Accordingly, in programming new software, it is necessary to generate the development environment for efficiently using the set of information and to manage the development project.

However, according to the conventional method of generating a development environment or an environment for programming software, a programmer was required to select tools for supporting programming and data, one by one. If there is a large amount of information to be selected there is a problem in that a tool to be incorporated has not been selected. Even if all the selected tools have been incorporated, some of them are not used at all in some programming procedures. Thus resulting in an inefficient generation of a suitable development or programming environment.

Further, when a hardware configuration and definition information of a programming environment is changed after the programming environment is once set, the programming environment needs to be reset to match the new status. Since the tools and data have to be selected one by one, the resetting work is troublesome.

As a method for automatically matching the operating system to a change of a hardware configuration, there is a "system generating system" which is disclosed in Japanese Patent document JP-A-H3-19023. This system, however, does not check whether the tools and data match the new hardware configuration and does not automatically install the tools and data which match it. Therefore, this system also has a problem that it is necessary to reset the development or programming environment as is the case with the above-described conventional method.

There is an increasing tendency wherein software development work is distributed and it is desirable that a system is to be built up which enables each programming station to generate its own tools and which also enables each station to refer to information of other stations. There is, however, a problem that the above-described conventional technique can not meet these requirements.

SUMMARY OF THE INVENTION

According to a first aspect of the present invention, definition information of a programming environment relating to a software programming station, including information of a tool system, programming procedures and a document system, is stored. A plurality of sets of names of tools and names of data which are necessary for developing a software are included in this definition information. In response to a request for setting a development environment, definition information, including a plurality of sets of tool and data names stored, is displayed so that a user can select some of the displayed sets of information. A transmission request for transmitting the tools and data shown in the selected set is generated. Then, the tools and data that have been transmitted by this request are automatically installed. In other words, according to the first aspect of the present invention, a method for generating an environment for software development is provided which enables tools and data to be sufficiently installed automatically and which can efficiently generate an environment for software development.

According to a second aspect of the present invention, definition information of a development environment relating to a software programming station, including information of a tool system, development procedures and a document system, is stored. A plurality of sets of names of tools and names of data which are necessary for developing a software are included in this definition information. Information relating to a hardware configuration and software configuration information relating to tools and data already installed is also stored. When the definition information or the information of hardware configuration changed, software information and names of a plurality of sets of tools and data are referred to. Then, matching of tools and data already installed with the definition information and hardware configuration after they have been changed is inspected. Those tools and data which have already been installed to match the definition information or hardware configuration after the change are automatically updated. In other words, according to the second aspect of the present invention, a method for maintaining an environment for software development is provided which enables suitable tools and data to be automatically re-installed for a change of a hardware configuration or the like so that matching of the development environment can be maintained.

According to a third aspect of the present invention, a transmitting and receiving section for transmitting and receiving information to and from other programming stations is provided so that definition information used in the other stations is transmitted and tools and data which meet the definition information are transmitted. The tools and data transmitted are automatically installed. In other words, according to the third aspect of the present invention, a method for generating an environment for software development is provided which can easily generate a development environment at each programming station when programming stations are distributed and which can easily refer to the development environments of the other stations.

DESCRIPTION OF THE PREFERRED EMBODIMENTS

The distributed information processing system of the present invention will be explained in detail with reference to the attached drawings, taking up as an example of a distributed software development or programming system.

Figure 1:
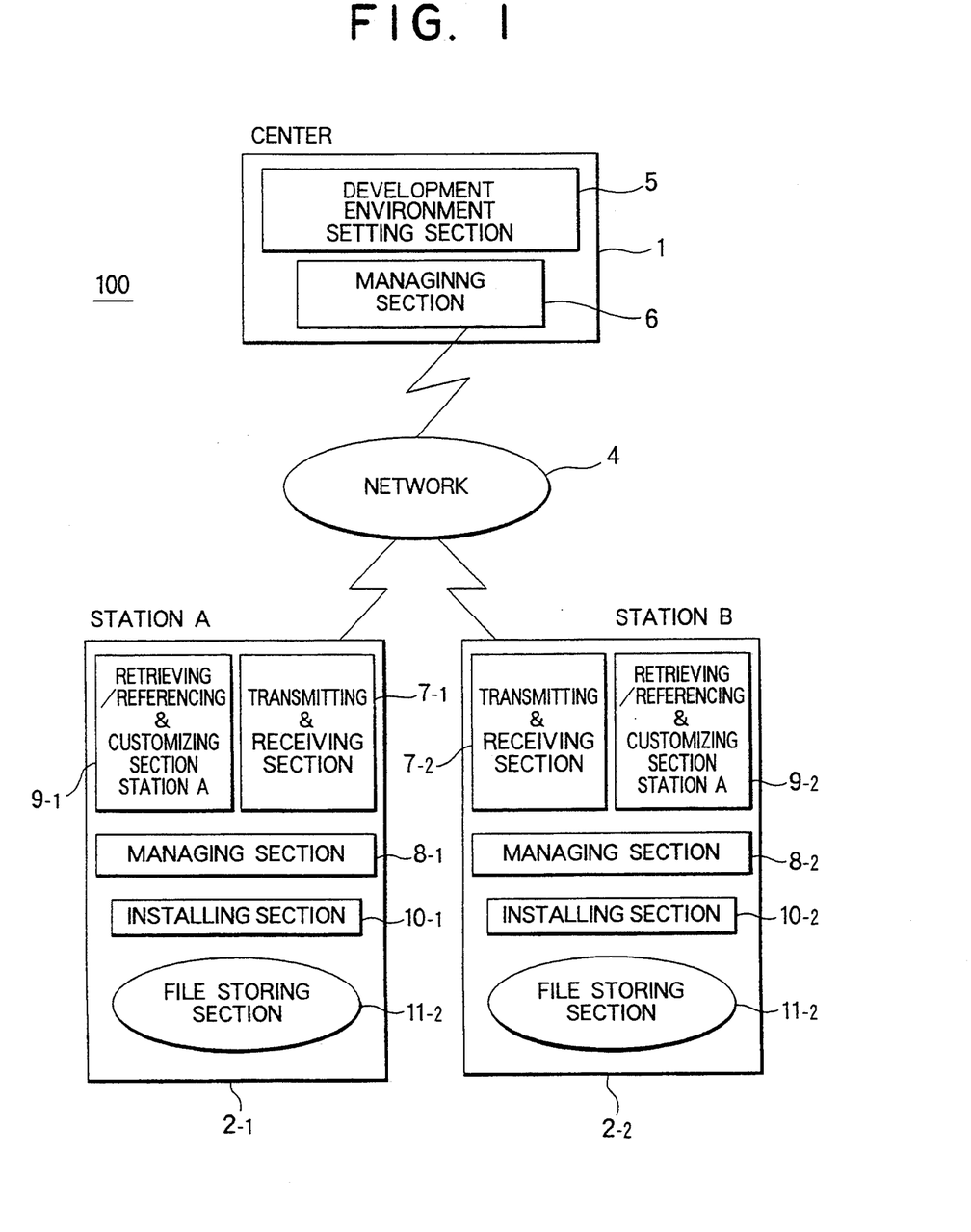
FIG. 1 is an overall configuration diagram for showing one embodiment of the system to which the present invention is applied.
Figure 2:
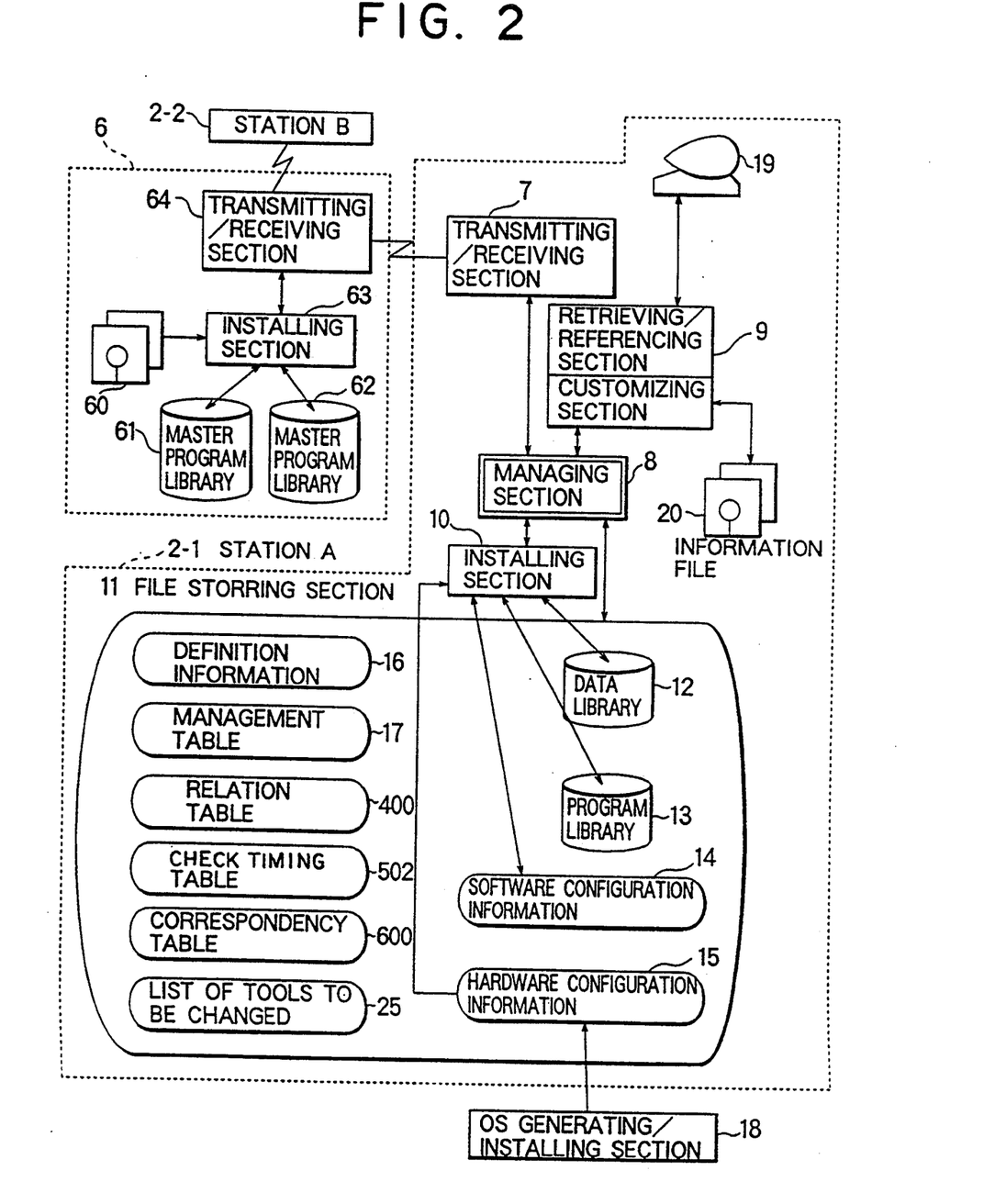
FIG. 2 is a system configuration diagram for showing the detailed configuration of the center and the distributed stations shown in FIG. 1.

Referring to FIG. 1, a distributed programming system 100 is structured by a center 1 and a plurality of distributed stations 2-$i$ ($i=1$ to n). In FIG. 1, the center 1 and two distributed stations 2-1 and 2-2 are shown and are connected with each other through a network 4. The center 1 has a section 5 having the same functions as each station 2-$i$ for setting a development or programming environment and a section 6 for managing libraries. The managing section 6 of the center 1 includes an installing section 63 for storing master tools and master data provided through media such as floppy disks 60 or the like into a master program library 61 and a master data library 62, respectively, and for managing these libraries 61 and 62 as master libraries and a transmitting and receiving section 64 for communicating with each distributed station 2-$i$ via the network 4, as shown in FIG. 2.

Explaining a distributed station 2-1 as a representative, each station 2-$i$ includes a transmitting and receiving section 7-1 (hereinafter to be simply referred to as 7, and the same applies to other sections), a section 8 for managing a development or programming environment, a retrieving/referencing and customizing section 9, an installing section 10, a file storing section 11, an OS generating/installing section 18 and an input/display section 19. A user inputs requests to the input/display section 19, and an output from the section 9 is displayed on the section 19. The file storing section 11 stores files which are necessary for managing various programming environments, and includes a data library 12, a program library 13, software configuration information 14, hardware configuration information 15, definition information 16 of the development environments, a management table 17, a relation table 400, a timing check table 502, a correspondency table 600, and a list 25 of tools to be changed. The program library 13 stores softwares (tools) which have already been installed. The data library 12 stores a group of data which are necessary when programs (tools) stored in the master program library 61 are loaded and executed. Data generated by each tool is also stored in the data library 12. The wording "data" used in the present embodiment all refers to the data to be stored in this library. The software configuration information 14 stores names and versions of the tools which have been installed in the program library 13 and are automatically generated by the installing section 10 when each program is installed. The hardware configuration information 15 stores names and type numbers of hardware devices that have been installed at each distributed station and is automatically generated when the system is initiated by the OS (operating system) generating/installing section 18.

The definition information 16 of the development or programming environment is for defining or prescribing how to progress the programming or how to manage the programming in accordance with the characteristics of the software development project such as the field, the scale and requirements of application system. This is used as a part of the development or programming environment for the programmer and the manager, and includes definition information of development procedures, a work menu, and a document system. The definition information of the document system includes a plurality of sets of information, each set including the name of a tool for preparing the document and data necessary for this tool.

Figure 3:
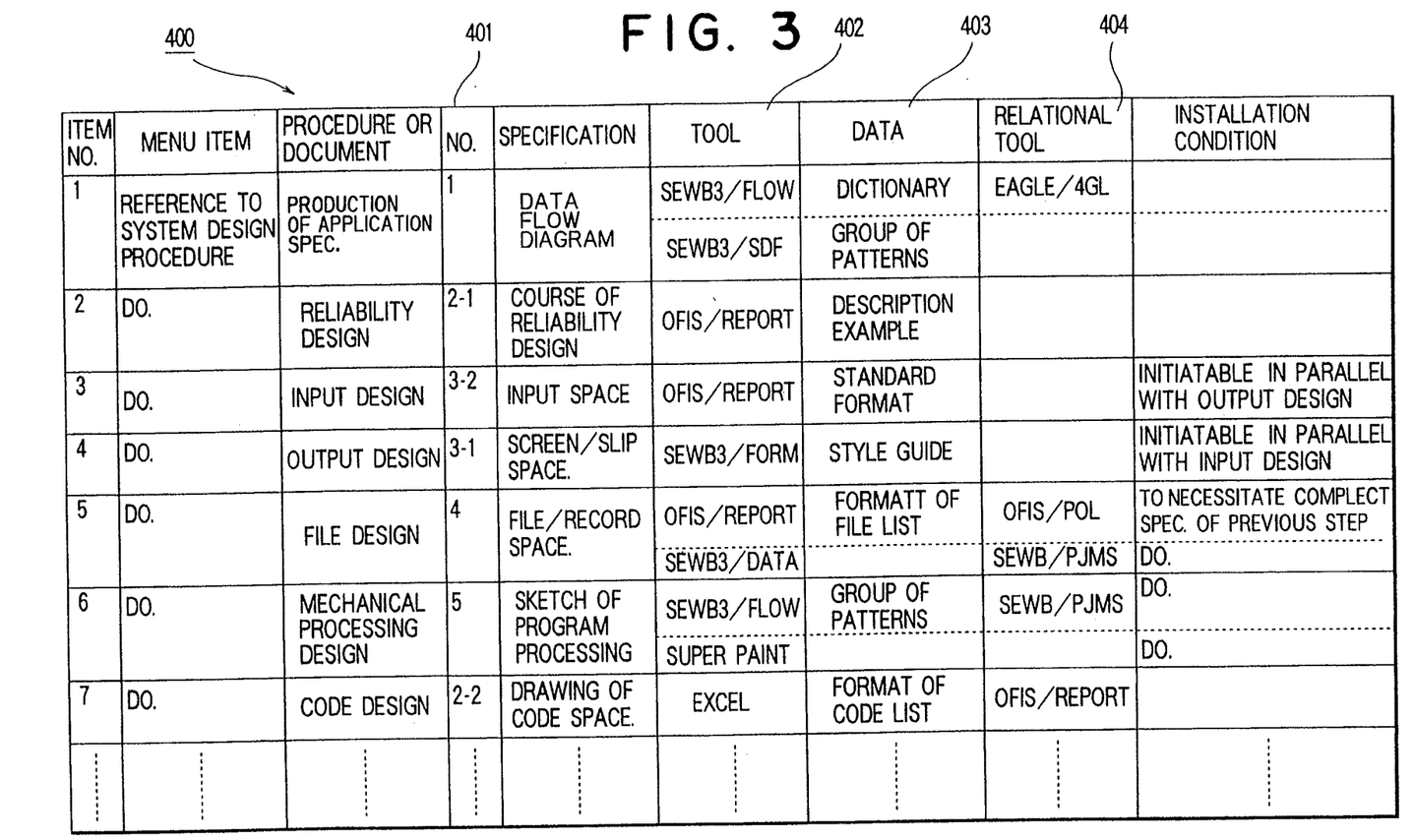
FIG. 3 is a diagram for showing an example of a relation table which explains relationships among menu items to be prepared in the processing, development procedures, documents to be generated, tools and data.

A relation table 400 shown in FIG. 3 includes columns of various information which are for a menu item such as "reference to system design procedure", for a development procedure such as "production of application specifications", or "reliability design", for a name of a specification document such as "data flow diagram", for a name of a tool used to support software programming such as "SEWB3/FLOW" or "SEWB/SDF", for a name of necessary data such as "dictionary", for a name of a relational tool to use together with a tool such as "EAGLE/4GL", and for information of installation conditions. The columns for "tool" 402, "data" 403 and "relational tool" 404 store as a set of a name of a tool, names of data necessary for the tool and names of relational tools related to the tool which have been retrieved from the definition information 16 to be registered.

Figure 4:
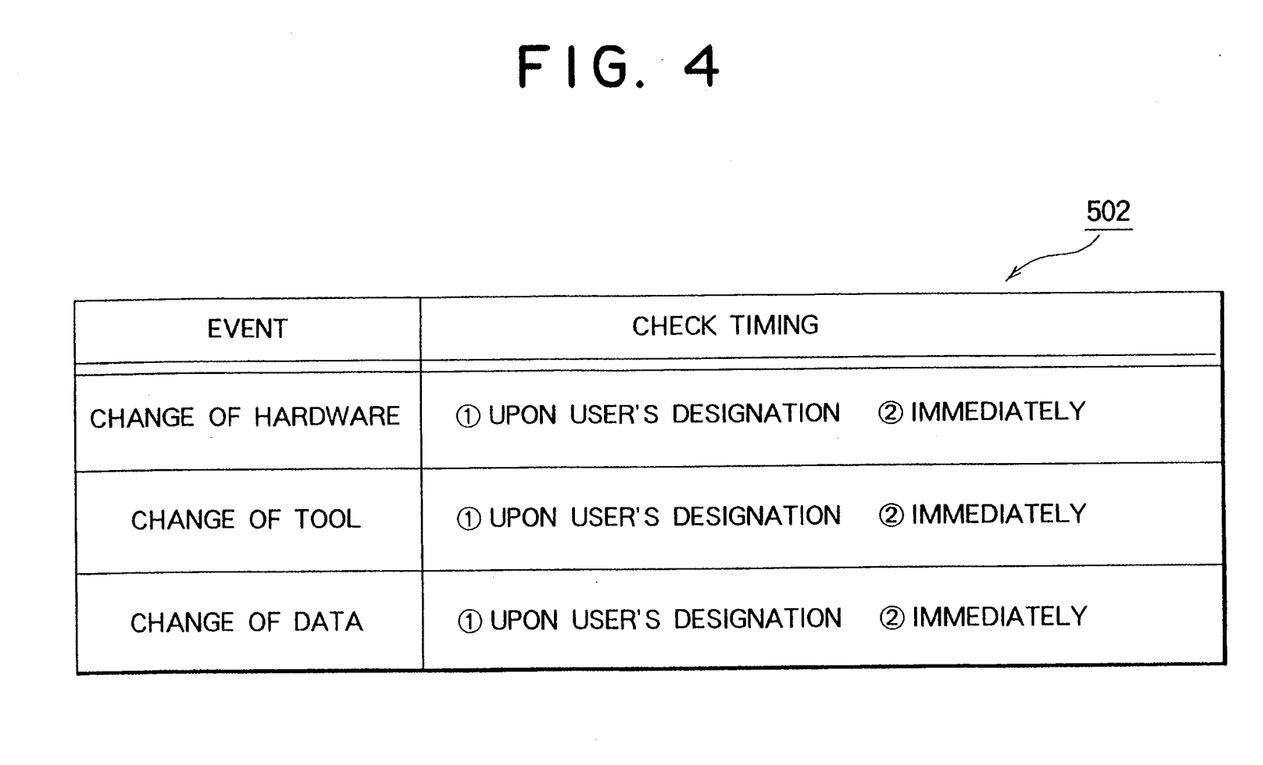
FIG. 4 is a diagram for showing an example of a check timing for checking matching upon occurrence of an event.

A check timing table 502 indicates when a processing corresponding to a change of the programming environment should be carried out if there is the change of the programming environment. The change of the programming environment is classified into three types of change, that is, the change of hardware, change of tool and change of data. The check timing is classified into two types, that is, the check to be made upon user's designation and the check to be made immediately.

Figure 5:
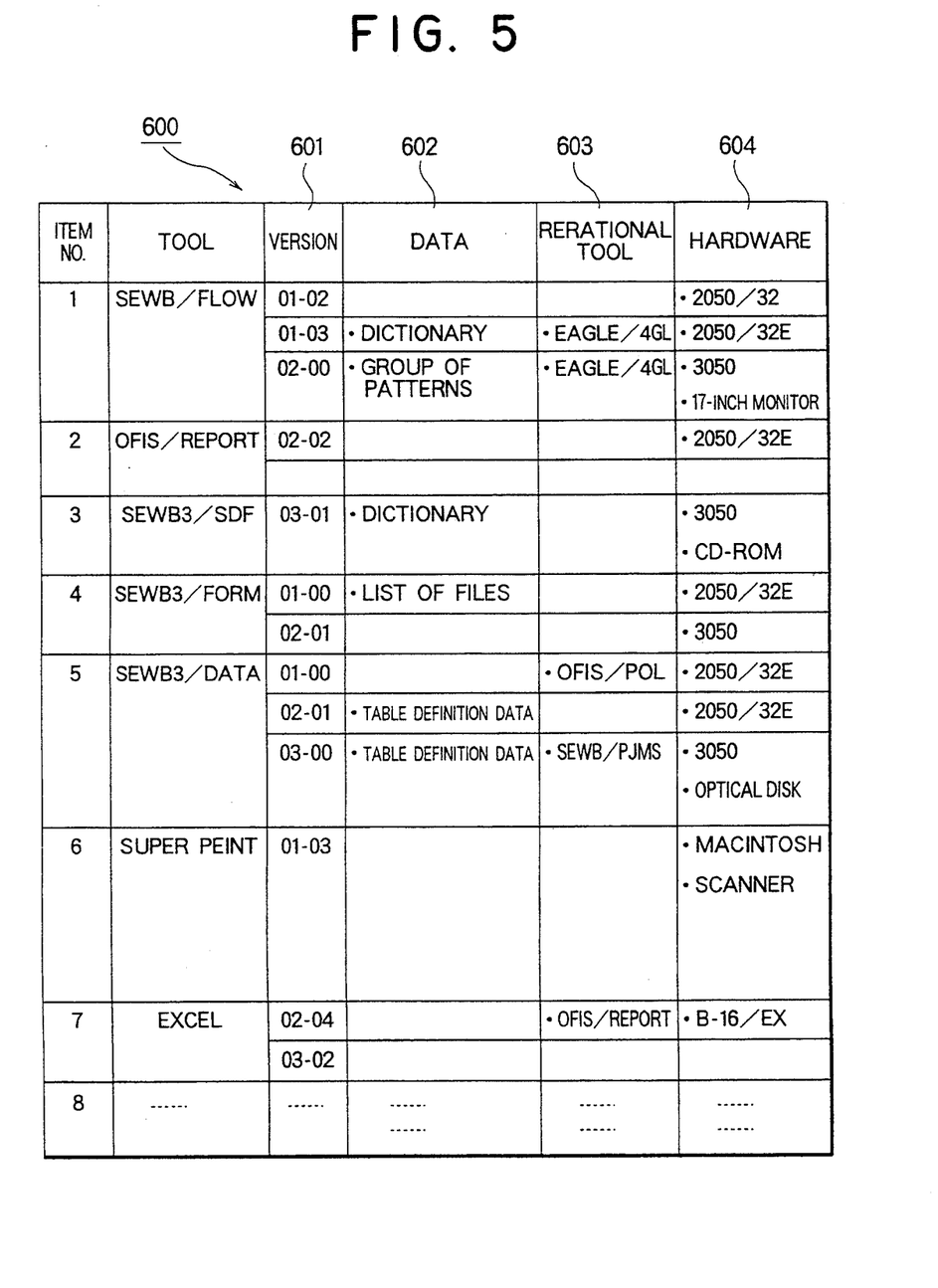
FIG. 5 is a diagram for showing an example of a correspondency table of software and hardware configurations which is to be used when matching is checked.

A correspondency table 600 shown in FIG. 5 indicates each of tools stored in the master program library 61, data, a relation tool and hardware, based on a version of the tool. These are transmitted from the center 1 each time the master program library 61 or the master data library 62 is changed.

The list of tools to be changed 25 covers the names of tools which have become necessary as a result of change of the tools or the like and the names of data necessary for the necessary tools.

The transmitting and receiving section 7 communicates with the managing section 6 of the center 1 and the transmitting and receiving section 7 of each of other stations through the network 4, to exchange tools, data and definition information. The managing section 8 makes an access to the file storing section 11, controls an operation of the retrieving/referencing and customizing section 9, controls the installing section 10 to automatically install programs and data in libraries 12 and 13 and checks matching of programs and data to software configuration and hardware configuration in this system. The retrieving/referencing and customizing section 9, as a user interface section of the input/display section 19, issues various requests to the managing section 8. The retrieving/referencing section 9 issues a retrieval/reference request to the managing section 8 in response to a request from the user to retrieval/reference information stored in the file storing section 11. Also, the section 9 issues the retrieval/reference request to the managing section of another station or the installing section 63 of the center 1 through the managing section 8 and the transmitting and receiving section 7 of this station and the response to the request transmitted thereto can be displayed. The programmer or the user can use the customizing section 9 for customizing definition information provided by a floppy disk 20 or transmitted thereto and producing definition information for this station 2-1. The installing section 10 installs or takes out programs (tools) and data under the control of the managing section 8, and updates software configuration information.

Figure 6:
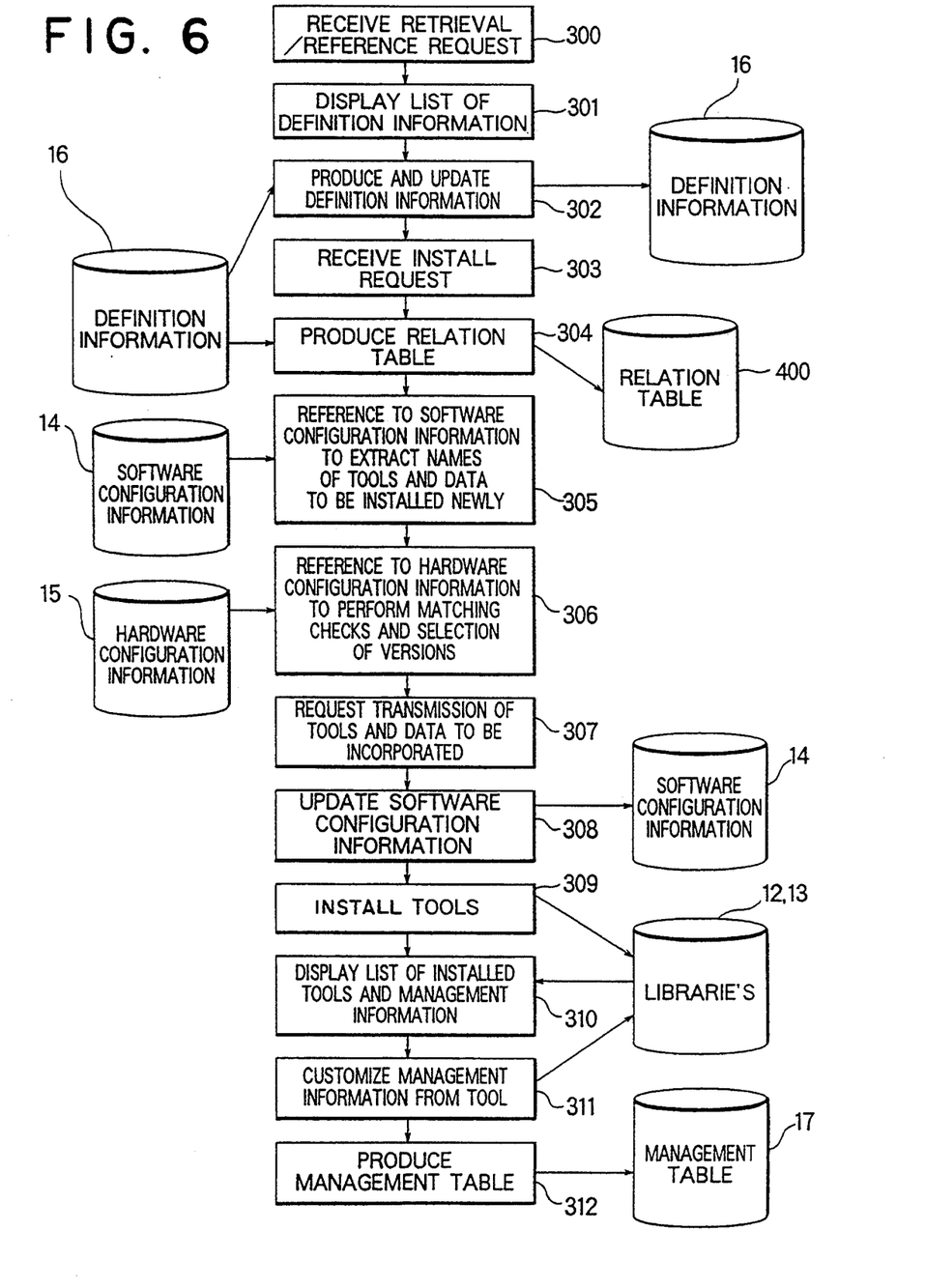
FIG. 6 is a flowchart for showing an automatic installing processing of tools and data.

The automatic installing processing which is carried out by the managing section 8 of the station 2-1 or 2-2 and the installing section 10 will be explained with reference to the flowchart shown in FIG. 6. Consider a case that the user desires to generate or prepare a software development environment. In case of initial generation, the user issues a retrieval/reference request to the installing section 63 or a managing section 8 of the other stations from the input/display section 19 through the section 9, the managing section 8 and the transmitting and receiving section 7 of this station to reference to tools registered in the master program library 61 or definition information of the other stations. In case of changing the existing development environment, the retrieval/reference request is issued to the managing section 8 of this station through the section 9 to know a list of tools already installed (Step 300). The section 8 makes an access to the software configuration information 14 and displays the list of software already installed on the input/display section 19 through the section 9 (Step 301). The user adds the tools from the center 1 or the other stations to the existing definition information and removes tools therefrom to generate new definition information and then to register the same into the file storing section (Step 302). When the user desires to install the tools, the user inputs an install request from the input/display section 19. This request is received by the customizing section 9 and is transmitted to the managing section (Step 303). When it is desired to build up the development or programming environment at each distributed station 2-*i* from the center 1, the install request may also be inputted from the managing section 6 of the center 1 into the managing section 8 of each station through the transmitting and receiving section 7 of the each station.

Upon receiving the install request, the managing section 8 refers to the definition information of the development procedures, the work menu and the document system, about the development environment, and produces the relation table 400 of the tools/data as shown in FIG. 3 to display the table on the display section 19 (Step 304). For example, the tool "SEWB3/FLOW" and the data "dictionary" have been defined as a set in the definition information. Various sets of tools and data such as the above are set in the relation table 400 shown in FIG. 3. Relational tools and installation conditions can also be included in the sets. When sets of information required by the user do not exist or when sets of information are not complete, the managing section 8 enquires the user and fills the columns of the "tools" 402, the "data" 403, the "relational tools" 404 and the "incorporation conditions" 405. The relation table 400 thus produced is displayed on the input/display section 19. When the user has selected any information of the development procedures, the menu items or the specifications, the managing section 8 extracts tools and data corresponding to the selected information from the columns 402, 403 and 404 of the relation table 400, refers to the software configuration information 14 and extracts tools and data which need to be installed newly (Step 305). In other words, when the information of the "production of application specifications" in the "development procedures" in FIG. 3 has been selected by the user, the "SEWB3/FLOW" and the "SEWB3/SDF" are extracted as the necessary tools, the "EAGLE/4GL" is extracted as the relational tool and the "dictionary" and the "group of patterns" are extracted as the necessary data. Whether some of the extracted tools and data have already been installed or not is checked by referring to the software configuration information 14 and tools and data to be newly installed are extracted. Next, the hardware configuration information 15 is referred to and matching of the extracted tools with the hardware configuration information 15 is checked to select versions of the tools (Step 306). Next, information including the names of the selected tools, names of data and versions of the tools is transmitted to the center 1 through the transmitting and receiving section 7 to request that the selected tools and data are transmitted to the requesting station (Step 307). When the center 1 transmits the tools and data in response to this request and they have been received by the requesting station, the managing section 8 updates the software configuration information 14 through the installing section 10 to install the new tools and data (Step 308). Then, the tools and data transmitted from the center 1 are installed in the program library 13 and stored in the data library 12 by the installing section 10 of the requesting station (Step 309). In this case, the managing section 8 refers to the information of the "No." 401 and the "installation conditions" 405 shown in FIG. 3 and produces a script describing execution procedures and initiation conditions of the tools to store the script in the program library 13 as well as the tools and data. This script is a program for carrying out a continuous execution and conditional initiation of a series of tools. Next, a list of the installed tools and a list of management information to be outputted by the tools are displayed on the screen of the input/display section 19 (Step 310). The management information can include the following:

① Progress information (number of pages, number of lines, number of steps and number of boxes)

② date of production/producer
③ updating date/updater
④ name of reference specification
⑤ rules of naming the products Output information of the tools is customized so that the information designated at the Step 310 can be outputted by the installed tools (Step 311). The result of this procedure is stored in the data library 12 and is referred to when each tool carries out an execution. Then, the management table 17 for storing management information outputted by each tool is produced and this is stored in the file storing section 11 (Step 312).

According to the above operation, when desired information is selected from among the development procedures, work menus and document system as part of the definition information of the development environment 16, names of tools, names of tools relational to the tool and names of data necessary for the tools are extracted. They are necessary to produce the software specified by the selected information. A request for transmitting the tools, the relational tools and the data of the extracted names is sent to the development center, and the tools, the relational tools and the data required by the user are transmitted to the distributed requesting station from the center to be automatically installed in the program library 13 and the data library 12. Accordingly, an extremely simple operation of selecting desired information from among the definition information of the development environment 16 allows the necessary tools and data to be installed efficiently and completely. In addition, the check of matching of the tools with the hardware configuration allows the tools and data adapted for the hardware configuration to be installed.

Figure 7:
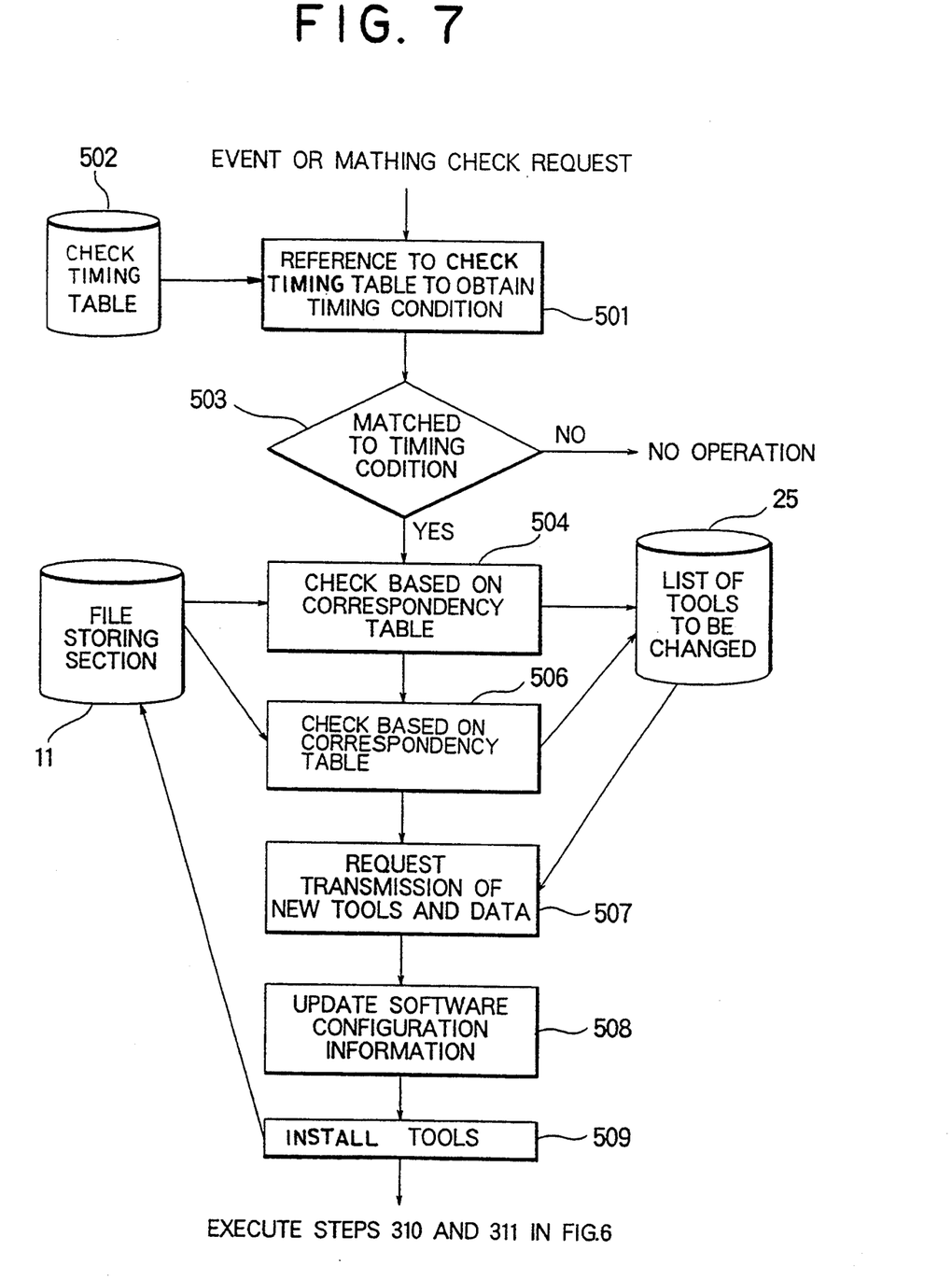
FIG. 7 is a flowchart for showing the processings of checking matching of hardware and software configurations with definition information and reinstalling tools which match the changed contents.

Next, the processing for maintaining consistency of the development or programming environment by checking at a suitable time the matching of the tools and data with the hardware configuration, the software configuration and the definition information of the development environment will be explained with reference to FIG. 7. When the user has inputted a request for checking the matching through the input/display section 19 or when an event of a change in any of the hardware configuration, software configuration and data occurred, a "timing check table" 502 as shown in FIG. 4 is referred to, and the check timing of the matching is determined (Step 501). The following types of timing are preset:
① check at the timing designated by the user; and
② check immediately at the timing when any of hardware configuration, software configuration or definition information of the development environment is changed.

At Step 503, the timing condition obtained by the reference is checked whether or not the timing condition is met. If the condition is met, the processings of Step 504 and subsequent steps are carried out. If the timing condition is not met, no action is taken, or matching is not checked.

In checking the matching, the software configuration information 14 and the hardware configuration information 15 in the file storing section 11 are referred to, and version numbers 501, data 502 and relational tools 603 to the tools (programs) are extracted by use of the correspondency table of software/hardware 600 as shown in FIG. 5. When it has become apparent as a result of this checking that any tools do not match to new hardware configuration or definition information because of a part change made in the hardware configuration or a part change made in the definition information of the development environment, the names of the tools newly required and the names of the tools which are not necessary any more are registered in the "list of tools to be changed" 25 (Step 506).

Further, by referring to the correspondency table 600, matching of the tools and the data and matching of the information of hardwares 604 and the version numbers 601 are checked. If it has become apparent that there is any of tools and data which can not match, the name of this tool or data and the name of the tool to be newly required are registered in the list of tools to be changed 25 (Step 506). Next, in the manner almost the same as the processings at Step 307 and the subsequent processings in FIG. 6, a request for transmitting the tools or data of the names registered in the list 25 is issued to the center 1 (Step 507). In response to this request, the tools or data requested are transmitted from the center 1, and when they have been received, the software configuration information 14 is updated by the installing section 10 to match the new installation (Step 508). The tools or data transmitted from the center 1 are installed in the program library 13 of the distributed requesting station and stored in the data library 12 thereof (Step 509). Then, the tool output information is customized.

Thus, according to the above-described procedures, when the hardware configuration or the definition information relating to the development or programming environment has been changed, the matching of the tools (versions and sufficiency of the tools) with the hardware configuration and the matching of the tools and data are automatically checked based on the user's designation, so that consistency of the development or programming environment can be maintained without requiring a troublesome procedure.

Figure 8:
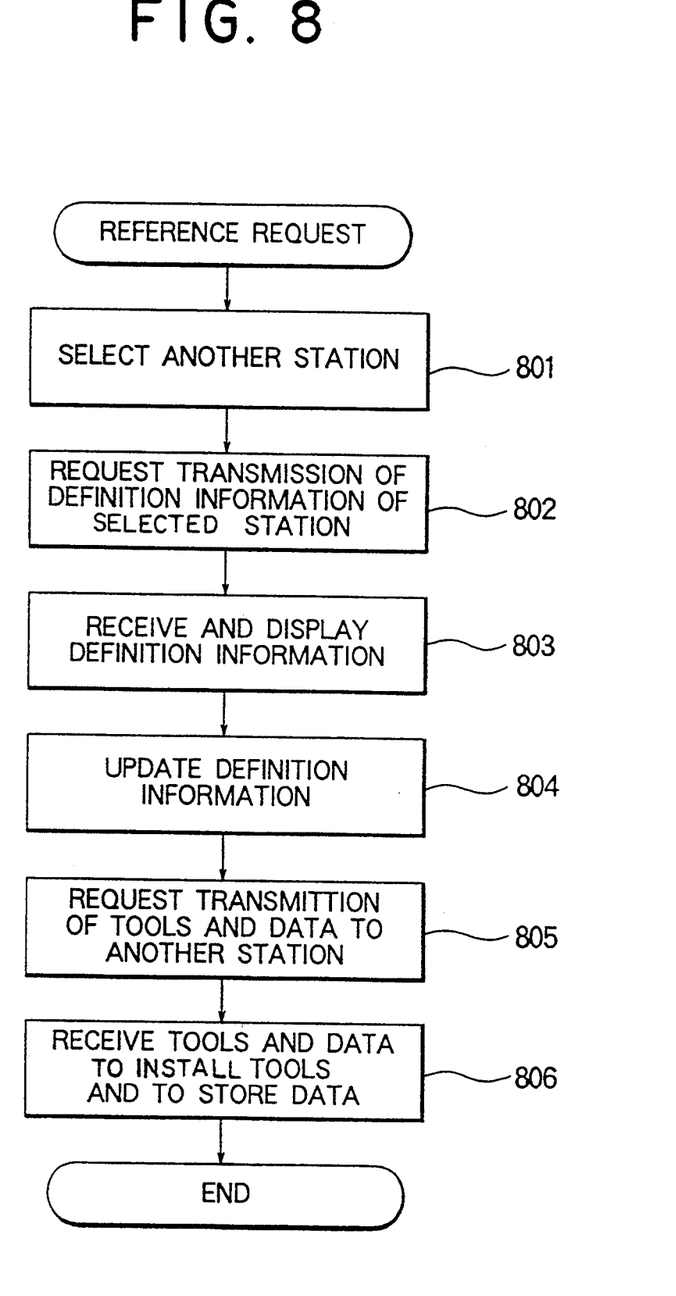
FIG. 8 is a flowchart for showing a processing for referring to a development environment of other stations.

Next, the processing for referring to the development environment of a station and another station will be explained with reference to the flowchart shown in FIG. 8.

When the development environment of the station 2-2 is to be referred to by the station 2-1, for example, a reference request operation is carried out at the input/display section 19-1 of the station 2-1 and the station 2-2 is selected as a destination station (Step 801). The managing section 8-1 requests the station 2-2 through the transmitting and receiving section 7-1 to transmit the definition information of the station 2-2 (Step 802). In response to this request, the station 2-2 transmits the definition information of the development environment, and when this definition information has been received by the station 2-1, this is displayed at the input/display section 19-1 (Step 803). When the displayed content of the definition information lacks definition information which is necessary for the user or includes definition information which is not necessary for the user, the user can modify the definition information contents to obtain necessary definition information (Step 804). Next, a request is issued to the center 1 to transmit the tools and data which match to the modified definition information (Step 805). This is because the information of each station, such as definition information, tools and data information, is being managed by the center 1. When the center 1 does not have necessary information, the center 1 inquires about such information from each station to obtain the information. When the tools and data have been transmitted from the center 1 to the transmission requesting station, they are received and installed in the libraries 13-1 and 12-1 (Step 806). Note that definition information of another station, which is stored in the floppy disk 20, may be inputted to the managing section 8 through the section 9 to store in file storing section 11 as the intra-station definition information. If the development environment which the user has used is saved in the floppy disk 20, it becomes possible to restore the development environment again to proceed development in the same environment as previous. By executing this procedure, it becomes possible to refer to the development environments of another station to develop a software in the same or similar condition as that of the development environment of the other station.

It is needless to mention that the present invention is not limited to the above-described embodiment but a variety of modification of the embodiment can be achieved within the scope of this invention. For example, although description has been made of the case where a distributed development environment is achieved, the present invention can also be applied to the case where a development work is carried out at a single station.

As described above, according to the present invention, definition information of a development environment relating to a software development station, including information of application fields of a development or programming system, development procedures and a document system, is stored. A plurality of sets of names of tools and names of data which are necessary for development or programming a software are included in this definition information. In response to a request for setting a development environment, definition information including a plurality of sets of tool and data names stored is displayed so that a user can select one or more of the displayed sets of information. A transmission request for transmitting the tools and data shown in the selected set is generated. Then, the tools and data that have been transmitted in response to this request are automatically installed in the requesting station. Accordingly, by an extremely simple operation that a desired one of the definition information is selected, it is possible to efficiently and completely install all the necessary tools and data so that a software development environment can be produced efficiently.

Further, according to the present invention, definition information of a development environment relating to a software programming station, including information of application fields of a tool system, development or programming procedures and a document system, is stored. A plurality of sets of names of tools and names of data which are necessary for development or programming a software are included in this definition information. Information relating to a hardware configuration and software configuration information relating to tools and data already installed is also stored. When the definition information or the information of hardware configuration has changed, software information and names of a plurality of sets of tools and data are referred to. Then, matching of tools and data already installed to the definition information and hardware configuration after they have been changed is inspected. Those tools and data which have already been installed to match the definition information or hardware configuration after the change are automatically updated. Accordingly, it is possible to automatically maintain the matching of the programming environment to the change of a hardware configuration or the like.

Further, according to the present invention, definition information used in other stations is transmitted and tools and data which meet the definition information are transmitted. The tools and data transmitted are automatically installed. Accordingly, it becomes possible to easily refer to the programming environments of other stations and to tools and data in the environment which is the same as or similar to the programming environments of the other stations.

What is claimed is:

1. In a software development supporting system including a plurality of stations connected through a network, a method for generating a software development environment, comprising the steps of:
   (a) storing at a first one of said plurality of stations, information on a development procedure which defines a series of work items to be performed in the course of a software development, and software tools to be used with and corresponding to each of the work items;
   (b) determining one or more software tools to be used with the work item as requested tools by making a reference to said information at a first station;
   (c) transmitting a request including names of said requested tools from the first station to a second station within said plurality of stations through said network;
   (d) transmitting, in response to said request, said requested tools and data corresponding thereto, from said second station to said first station through said network; and
   (e) storing said requested tools and said data into a program library and a data library respectively in said first station.

2. A method according to claim 1, further comprising the step of storing software configuration information which includes names and versions of said software tools already stored in said program library in said first station, said software configuration information being referred to determine that said software tools to be used with the work item are not stored in said program library and are said requested tools in said determining step.

3. A method according to claim 2, further comprising the step of updating said software configuration information when said requested tools are stored.

4. A method according to claim 2, further comprising the step of checking matching of said requested tools with hardware configuration of the first station and versions of said requested tools, based on hardware configuration information indicating the hardware configuration of the first station.

5. A method according to claim 2, further comprising the steps of:
   selecting the second station by said first station; and
   transmitting said definition information to the first station from said second station in response to a request for the definition information from said first station.

6. A method according to claim 5, further comprising the step of modifying, at the first station, the definition information received, based on the software development environment of the first station.

7. In a software development supporting system including a plurality of stations connected through a network, a method for generating a software development environment, comprising the steps of:
  (a) storing information on hardware configuration of a first station within said plurality of stations;
  (b) storing software configuration information which includes names and versions of software tools used for a software development at the first station;
  (c) storing information on a correspondency between said software tool and matching hardware equipments to operate the software tool at the first station;
  (d) examining whether said software tools stored in said software configuration information match said hardware configuration information based on hardware configuration, software configuration information and said correspondency information at the first station;
  (e) determining one or more software tools which do not match said hardware configuration as a result of the examining step at the first station;
  (f) transmitting a request including names of said software tools from the first station to a second station within said plurality of stations through said network;
  (g) transmitting, in response to said request, said software tools and data corresponding thereto, from said second station to said first station through said network; and
  (h) storing said software tools and said data into a program library and a data library respectively in said first station.

* * * * *